US012686141B2

(12) United States Patent
Maheshwarappa et al.

(10) Patent No.: US 12,686,141 B2
(45) Date of Patent: Jul. 21, 2026

(54) ELECTRO-PNEUMATIC CABLE CUTTER ASSEMBLY FOR AIRCRAFT HOIST

(71) Applicant: Hornet AcquisitionCo, LLC, Vancouver, WA (US)

(72) Inventors: Ramesh Maheshwarappa, Bangalore (IN); Poly John, Cochin (IN)

(73) Assignee: HORNET ACQUISITIONCO, LLC, Vancouver, WA (US)

( * ) Notice: Subject to any disclaimer, the term of this patent is extended or adjusted under 35 U.S.C. 154(b) by 197 days.

(21) Appl. No.: 17/950,987

(22) Filed: Sep. 22, 2022

(65) Prior Publication Data

US 2024/0001576 A1 Jan. 4, 2024

(30) Foreign Application Priority Data

Jul. 1, 2022 (IN) .............................. 202241038043

(51) Int. Cl.
*B26D 5/12* (2006.01)
*B64D 1/22* (2006.01)

(52) U.S. Cl.
CPC *B26D 5/12* (2013.01); *B64D 1/22* (2013.01)

(58) Field of Classification Search
CPC ......... B26D 5/12; B64D 1/22; F16K 31/0658; F16K 31/0655
See application file for complete search history.

(56) References Cited

U.S. PATENT DOCUMENTS

| | | | | |
|---|---|---|---|---|
| 1,587,921 | A | * 6/1926 | Ray | F16K 31/0658 |
| | | | | 251/129.21 |
| 2,324,642 | A | * 7/1943 | Peterson | F16K 31/0655 |
| | | | | 251/76 |
| 3,074,163 | A | 1/1963 | Wohler et al. | |
| 3,554,468 | A | 1/1971 | McVicar | |
| 3,848,334 | A | * 11/1974 | Mattera | H01R 43/042 |
| | | | | 30/180 |

(Continued)

FOREIGN PATENT DOCUMENTS

WO WO-2016058805 A1 * 4/2016 ........... F02M 59/368

OTHER PUBLICATIONS

DE_102011052526_A1 (Year: 2023).*

(Continued)

*Primary Examiner* — Jonathan G Riley
(74) *Attorney, Agent, or Firm* — SNELL & WILMER L.L.P.

(57) ABSTRACT

A cable cutter assembly for an aircraft hoist is disclosed, and includes an actuator assembly (e.g., at least one pressurized fluid cavity, a first outlet port, and a solenoid that includes a coil and an armature). The armature is movable between closed and open positions relative to the first outlet port (e.g., via an actuation force), with the armature engaging the first outlet port for the closed position (e.g., a valve seal incorporated by the armature) and being spaced from the first outlet port for the open position. A cutter body includes a cutter body cavity that is fluidly connected with the first outlet port. A cutter is movably disposed within the cutter body cavity. Disposing the armature in the open position (e.g., via energizing the coil) fluidly connects the pressurized fluid cavity with the cutter body cavity to move the cutter in a cable cutting direction.

12 Claims, 7 Drawing Sheets

(56) References Cited

U.S. PATENT DOCUMENTS

| 4,826,103 | A | * | 5/1989 | McKown | B64C 27/006 |
| | | | | | 83/639.4 |
| 8,047,464 | B2 | | 11/2011 | Peckham et al. | |
| 11,169,552 | B2 | * | 11/2021 | John | G05D 16/2093 |
| 2016/0325454 | A1 | * | 11/2016 | Povroznik, III | B64C 1/32 |
| 2018/0215593 | A1 | | 8/2018 | Friederichs et al. | |

OTHER PUBLICATIONS

EP_4279781_A1 (Year: 2013).*
European Patent Office, European Search Report dated Dec. 11, 2023 in Application No. 23182518.3.

* cited by examiner

ELECTRO-PNEUMATIC CABLE CUTTER ASSEMBLY FOR AIRCRAFT HOIST

CROSS-REFERENCE TO RELATED APPLICATIONS

This application claims priority to, and the benefit of, India Patent Application No. 202241038043 (DAS CODE: E27A), filed Jul. 1, 2022, and titled "ELECTRO-PNEU-MATIC CABLE CUTTER ASSEMBLY FOR AIRCRAFT HOIST," which is incorporated by reference herein in its entirety for all purposes.

FIELD

The present disclosure generally relates to the field of aircraft and, more particularly, to cable cutters for an aircraft hoist.

BACKGROUND

The helicopter airborne rescue mission may utilize a hoist cable. A typical hoist cable uses stainless steel rope attached to a cable drum of the hoist at one end and a hook at the other. This cable shares the load of rescuers or the rescuing items and the causalities. The cable should withstand being reeled in and reeled out from the hoist drum. Existing hoists include an option for cutting the cable. For instance, during rescue operations the cable may fail due to overload or the cable may be defective, such that it would be desirable to cut the cable "above" the damaged area. Moreover, it may be desirable to cut the cable if the cable gets stuck during a rescue operation. Existing hoist systems currently use an electric squib-based cable cutter for cutting the cable. This electric squib initiator uses explosive materials to generate the force required to cut the cable. That is, the electrical energization of the squib generates pressurized gas that acts on a movable piston that incorporates a cutter knife (a "cutter-piston"). Generation of this force is very fast and the cutter-piston experiences rapid sliding movement such that the cutter knife edge cuts/servers the cable.

The major drawbacks of the above-noted squib-based cable cutter are the regulatory issues because of the explosive material that is utilized. Moreover, this is single shot initiator device and has no built-in test features. This squib-based cable cutter also cannot be shipped as a part of the hoist as it contains explosive. Being an explosive-type initiator, it may be susceptible to inadvertent firing due to mechanically abusive loads as well.

SUMMARY

A cable cutter assembly for a hoist is presented herein. Both the configuration of such a cable cutter assembly and the operational characteristics/operation of such a cable cutter assembly are within the scope of this Summary.

One aspect is embodied by a cable cutter assembly for a hoist. This hoist may be incorporated by an aircraft of any appropriate size, shape, configuration, and/or type and including without limitation a helicopter. The cable cutter assembly includes an actuator assembly, which in turn includes at least one pressurized fluid cavity, a first outlet port, and a solenoid that includes at least a coil and an armature or plunger. The armature is movable between closed and open positions relative to the first outlet port, with the armature engaging the first outlet port for the closed position (e.g., a valve seal incorporated by the armature) and being spaced from the first outlet port for the open position. A cutter body includes a cutter body cavity that is fluidly connected with the first outlet port. A cutter is disposed (e.g., movably) within the cutter body cavity. Disposing the arma-ture in the open position (e.g., via energizing the coil) fluidly connects the pressurized fluid cavity with the cutter body cavity to move the cutter in a cable cutting direction.

Another aspect is embodied by a cable cutter assembly for a hoist. This hoist may be incorporated by an aircraft of any appropriate size, shape, configuration, and/or type and including without limitation a helicopter. The cable cutter assembly includes an actuator assembly that in turn includes a body (e.g., a solenoid body) and a solenoid. The body includes a first pressurized fluid cavity and a first fluid passage that extends from the first pressurized fluid cavity. The solenoid includes a coil and an armature or plunger, with the armature including a second fluid passage that is fluidly interconnected with the first fluid passage, and with the armature being movable between a first position and a second position. An air gap exists between the armature and the body at least when the solenoid/armature is in the first position. A second pressurized fluid cavity is fluidly inter-connected with the first fluid passage (and thereby the first pressurized fluid cavity) by the second fluid passage. The actuator assembly includes at least one outlet port (e.g., a first outlet port). The armature (e.g., a valve seal incorpo-rated by the armature) engages the first outlet port when the armature is in the first position. A cutter body includes a cutter body cavity. A cutter is disposed (e.g., movably) within the cutter body cavity. Disposing the armature in the second position (e.g., via energizing the coil) disposes the armature in spaced relation to the first outlet port, fluidly connects the second pressurized fluid cavity with the cutter body cavity, and moves the cutter in a cable cutting direc-tion.

Another aspect is embodied by a method of operating an aircraft hoist assembly. A pressurized fluid (e.g., a pressur-ized fluid source) may be fluidly isolated (e.g., via a valve) from a cutter. This fluid isolation may be terminated or removed (e.g., by opening a valve, such as by moving an armature away from a first outlet port). The cutter may be moved in response to this termination or removal of the fluid isolation (e.g., via the pressurized fluid now acting on the cutter. Movement of the cutter via exposure to the pressur-ized fluid may cut a cable of the aircraft hoist assembly.

Various aspects of the present disclosure are also addressed by the following examples and in the noted combinations:

1. A cable cutter assembly for a hoist, comprising:
   an actuator assembly comprising:
     at least one pressurized fluid cavity;
     a first outlet port;
     a solenoid comprising a coil and an armature, wherein
       said armature is movable between a closed position
       and an open position relative to said first outlet port,
       wherein said armature engages said first outlet port
       when in said closed position and is spaced from said
       first outlet port when and said open position;
   a cutter body comprising a cutter body cavity fluidly
     connected with said first outlet port; and
   a cutter disposed within said cutter body cavity;
   wherein disposing said armature in said open position
     fluidly connects said at least one pressurized fluid
     cavity with said cutter body cavity to move said cutter
     in a cable cutting direction.

2. The cable cutter assembly of paragraph 1, wherein said at least one pressurized fluid cavity comprises a pressurized fluid.

3. The cable cutter assembly of paragraph 2, wherein said pressurized fluid comprises at least one gas.

4. The cable cutter assembly of any of paragraphs 1-3, wherein said armature is moved from said closed position to said open position in response to energizing said coil.

The cable cutter assembly of any of paragraphs 1-4, wherein said armature comprises a valve seal that engages said first outlet port when said armature is in said closed position.

6. The cable cutter assembly of any of paragraphs 1-5, further comprising a biasing member engaged with said armature and biasing said armature toward said closed position.

7. The cable cutter assembly of paragraph 6, wherein said biasing member comprises a spring.

8. The cable cutter assembly of any of paragraphs 1-7, wherein said cutter body further comprises a cable zone aligned with said cutter, wherein said cutter is disposed between said cable zone and said first outlet port.

9. The cable cutter assembly of paragraph 8, further comprising:

a cable extending through said cutter body, within said cable zone, and aligned with said cutter.

10. The cable cutter assembly of any of paragraphs 8-9, further comprising:

a stopper aligned with said cutter.

11. The cable cutter assembly of paragraph 10, wherein said cable zone is disposed between said stopper and said cutter.

12. An aircraft comprising the cable cutter assembly of any of paragraphs 1-11.

13. The aircraft of paragraph 12, further comprising a hoist assembly.

14. The aircraft of paragraph 13, wherein said hoist assembly comprises a hook assembly, wherein said cable cutter assembly is operable to sever said hook assembly from a remainder of said hoist assembly.

15. A helicopter comprising the cable cutter assembly of any of paragraphs 1-11.

16. The helicopter of paragraph 15, further comprising a hoist assembly.

17. The helicopter of paragraph 16, wherein said hoist assembly comprises a hook assembly, wherein said cable cutter assembly is operable to sever said hook assembly from a remainder of said hoist assembly.

18. A cable cutter assembly for a hoist, comprising:

an actuator assembly comprising:

a body comprising a first pressurized fluid cavity and a first fluid passage extending from said first pressurized fluid cavity;

a solenoid comprising a coil and an armature, the armature comprising a second fluid passage fluidly interconnected with said first fluid passage and movable between a first position and a second position, wherein said armature and said body define an airgap therebetween when said solenoid is in said first position;

a second pressurized fluid cavity fluidly interconnected with said first fluid passage by said second fluid passage; and a first outlet port, wherein said armature engages said first outlet port when said armature is in said first position;

a cutter body comprising a cutter body cavity; and a cutter disposed within said cutter body cavity, wherein activation of said solenoid moves said armature to said second position, thereby disposing said armature in spaced relation to said first outlet port, fluidly connecting said second pressurized fluid cavity with said cutter body cavity, and moving said cutter in a cable cutting direction.

19. The cable cutter assembly of paragraph 18, wherein said first pressurized fluid cavity, said second pressurized fluid cavity, said first fluid passage, and said second fluid passage each comprise a pressurized fluid.

20. The cable cutter assembly of paragraph 19, wherein said pressurized fluid comprises at least one gas.

21. The cable cutter assembly of any of paragraphs 19-20, wherein pressurized fluid is at a common static pressure in each of said first pressurized fluid cavity, said second pressurized fluid cavity, said first fluid passage, and said second fluid passage when said armature is in said first position.

22. The cable cutter assembly of any of paragraphs 18-21, wherein said armature is moved from said first position to said second position in response to energizing said coil.

23. The cable cutter assembly of any of paragraphs 18-22, wherein said armature comprises a valve seal that engages said first outlet port when said armature is in said first position.

24. The cable cutter assembly of any of paragraphs 18-23, further comprising a biasing member engaged with said armature and biasing said armature toward said first position.

25. The cable cutter assembly of paragraph 24, wherein said biasing member comprises a spring.

26. The cable cutter assembly of any of paragraphs 18-25, wherein said cutter body further comprises a cable zone aligned with said cutter, wherein said cutter is disposed between said cable zone and said first outlet port.

27. The cable cutter assembly of paragraph 26, further comprising:

a cable extending through said cutter body, within said cable zone, and aligned with said cutter.

28. The cable cutter assembly of any of paragraphs 26-27, further comprising:

a stopper aligned with said cutter.

29. The cable cutter assembly of paragraph 28, wherein said cable zone is disposed between said stopper and said cutter.

30. An aircraft comprising the cable cutter assembly of any of paragraphs 18-29.

31. The aircraft of paragraph 30, further comprising a hoist assembly.

32. The aircraft of paragraph 31, wherein said hoist assembly comprises a hook assembly, and wherein said cable cutter assembly is operable to sever said hook assembly from a remainder of said hoist assembly.

33. A helicopter comprising the cable cutter assembly of any of paragraphs 18-29.

34. The helicopter of paragraph 33, further comprising a hoist assembly.

35. The helicopter of paragraph 34, wherein said hoist assembly comprises a hook assembly, and wherein said cable cutter assembly is operable to sever said hook assembly from a remainder of said hoist assembly.

36. A method of operating an aircraft hoist assembly, comprising:

isolating a pressurized fluid from a cutter;

terminating said isolating;

moving said cutter in response to said terminating; and cutting a cable of said aircraft hoist assembly in response to said moving said cutter.

37. The method of paragraph 36, wherein said pressurized fluid comprises at least one gas.

38. The method of any of paragraphs 36-37, wherein said isolating comprises engaging a valve seal on an armature of a solenoid against a first outlet port.

39. The method of paragraph 38, wherein said terminating comprises moving said armature away from said first outlet port.

40. The method of paragraph 39, wherein said moving said armature comprises energizing a coil of said solenoid.

41. The method of any of paragraphs 36-40, wherein said moving said cutter comprises exerting a fluid pressure on said cutter with said pressurized fluid.

42. The method of paragraph 36, further comprising using the cable cutter assembly of any of paragraphs 1-14.

43. The method of paragraph 36, further comprising using the cable cutter assembly of any of paragraphs 18-29.

BRIEF DESCRIPTION OF THE DRAWINGS

The subject matter of the present disclosure is particularly pointed out and distinctly claimed in the concluding portion of the specification. An understanding of the present disclosure may be further facilitated by referring to the following detailed description and claims in connection with the following drawings. While the drawings illustrate various embodiments employing the principles described herein, the drawings do not limit the scope of the claims. Reference to "in accordance with various embodiments" in this Brief Description of the Drawings also applies to the corresponding discussion in the Detailed Description.

DETAILED DESCRIPTION

Figure 1:
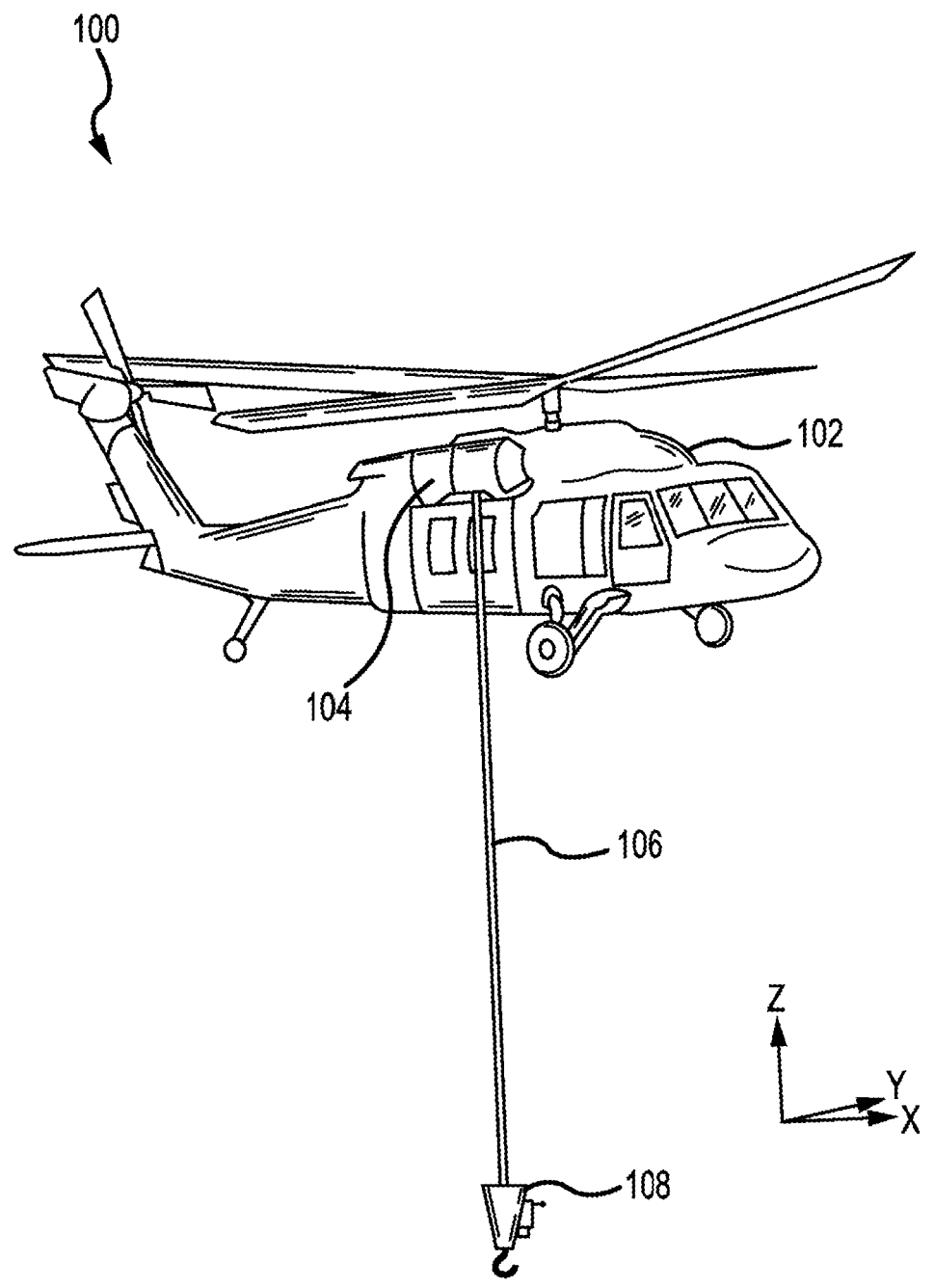
FIG. 1 is a perspective view of an exemplary hoist assembly and hook assembly mechanically coupled to an aircraft, in accordance with various embodiments.

An exemplary hoist and hook system 100 is shown in FIG. 1 and is identified by reference numeral 100. The hoist and hook system 100 includes a hoist assembly 104 that is mechanically coupled to an airframe or aircraft 102 (e.g., a helicopter or any other appropriate aircraft). The hoist assembly 104 may be coupled directly to the airframe 102 or may be mechanically coupled to a boom that in turn is mechanically coupled to the airframe 102. In any case, a cable 106 may be wound about a drum within the hoist assembly 104 and deployed or retracted based on the rotational direction of the drum. The cable 106 may thus hang at various distances from the hoist assembly 104 and airframe 102. A hook assembly 108 may be coupled to a free end of the cable 106 opposite the drum for the hoist assembly 104. The hook assembly 108 may hang from the hoist assembly 104 on the cable 106. The cable 106 and hoist assembly 104 may thus swing and/or translate relative to the hoist assembly 104 and the airframe 102. The position of the hoist assembly 104 may be controlled in part by changing the position of the hoist assembly 104 and/or the airframe 102.

Figure 2:
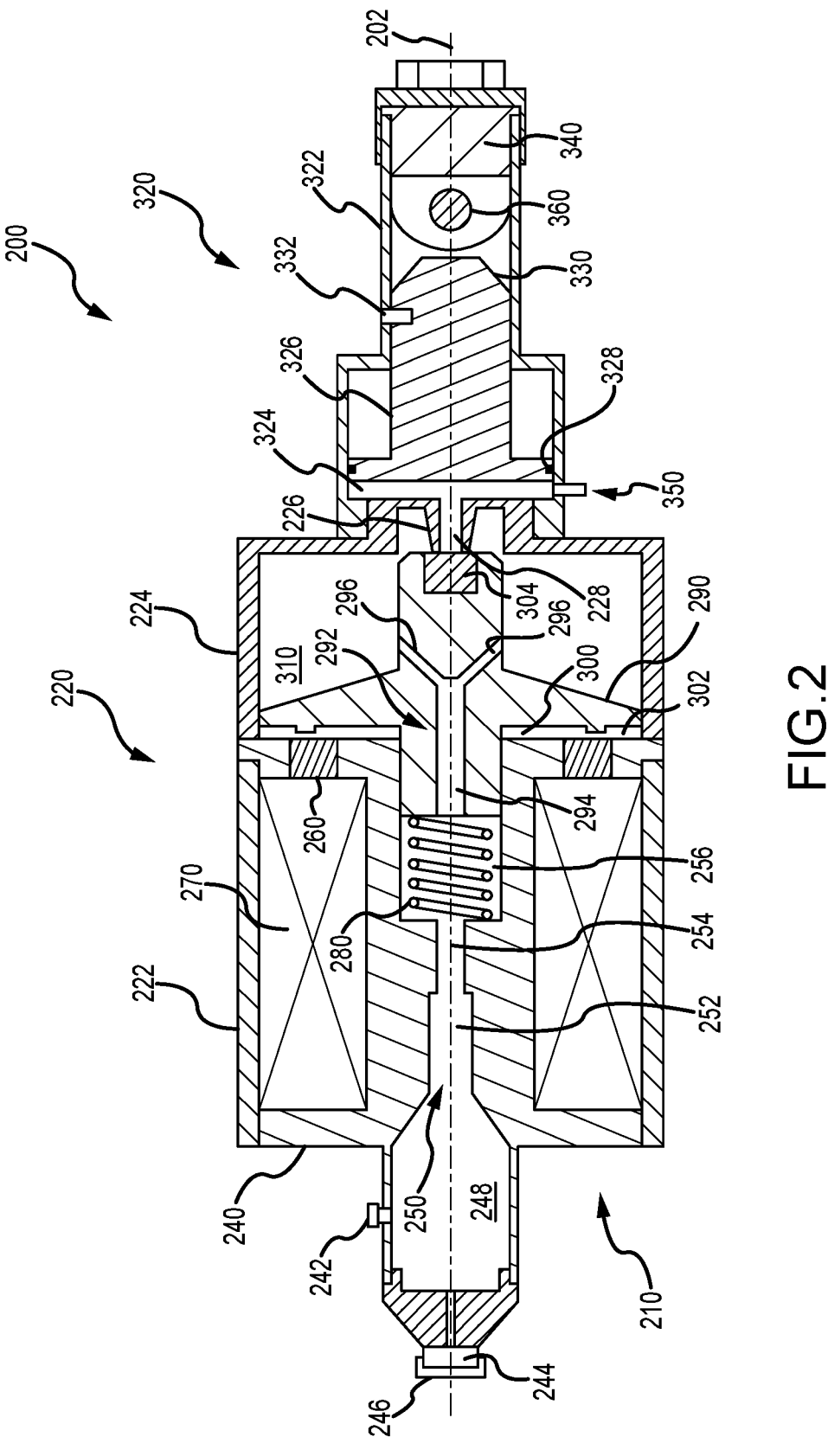
FIG. 2 is a cross-sectional view of a cable cutter assembly for a hoist and with an actuator assembly/armature being in a closed position, in accordance with various embodiments.
Figure 3:
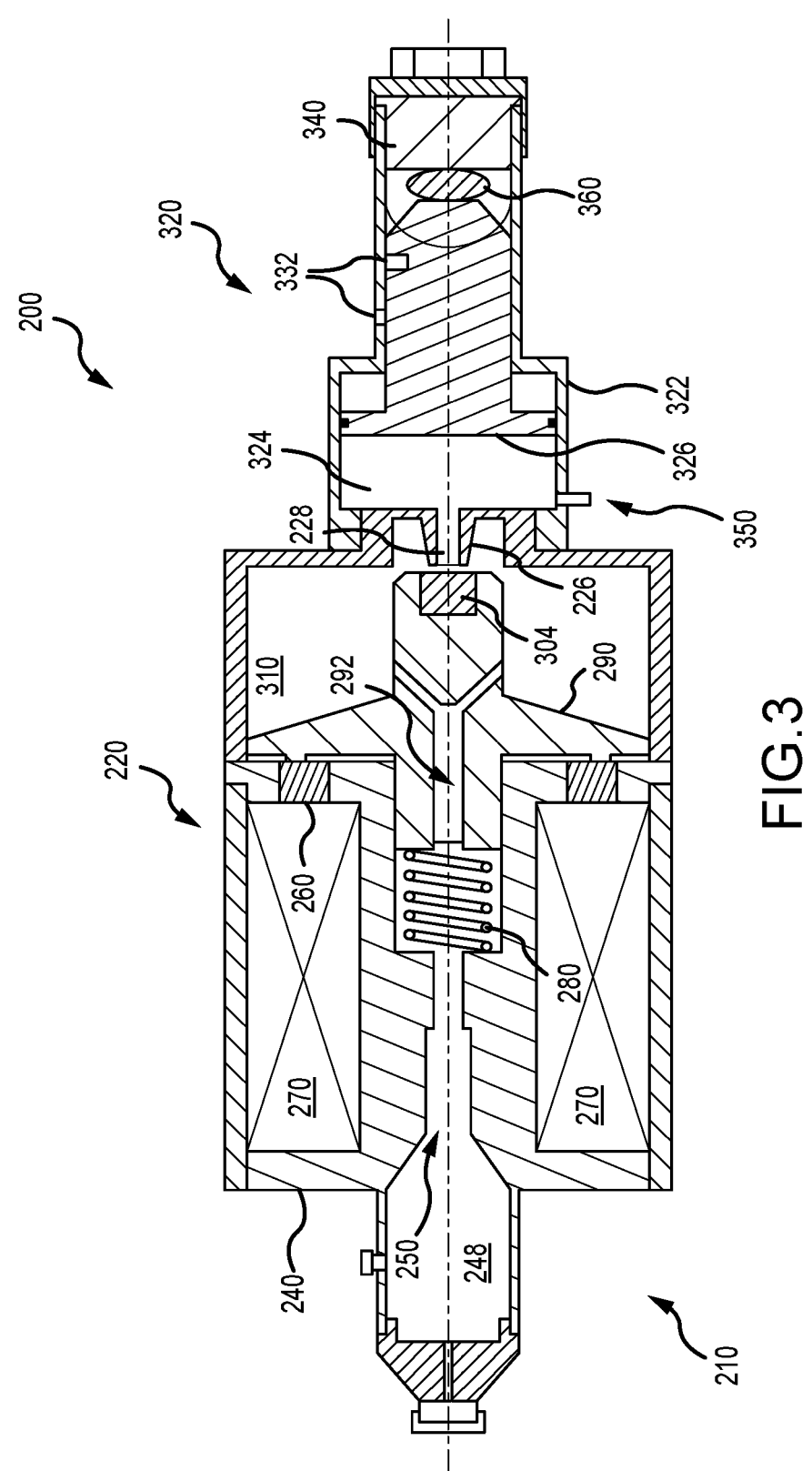
FIG. 3 is a cross-sectional view of the cable cutter assembly of FIG. 2 with the actuator assembly/armature being in an open position, in accordance with various embodiments.

A cable cutter assembly that may be used in combination with a hoist (e.g., hoist assembly 104—FIG. 1) is illustrated in FIGS. 2-3, is identified by reference numeral 200, and extends along a longitudinal axis 202 (corresponding with a longitudinal or length dimension for the cable cutter assembly 200 and the various components thereof). The cable cutter assembly 200 may be used to cut/sever a rope, tether, or cable (hereafter "cable") for a hoist/hoist assembly (e.g., cable 106—FIG. 1) for a hoist (e.g., hoist assembly 104—FIG. 1) used by an aircraft (e.g., aircraft 102—FIG. 1). The cable cutter assembly 200 includes what may be characterized as an actuator assembly 210 (e.g., in the form of a solenoid; utilizing a coil 270 and an armature or plunger 290) and a cutter assembly 320. Generally, the actuator assembly 210 includes a pressurized fluid with a valve (e.g., a solenoid valve) that is selectively movable/actuated between closed and open positions. Moving the valve to the open position releases the pressurized fluid to exert a fluid pressure on the cutter assembly 320 to in turn move a portion of the cutter assembly 320 to engage and cut/sever a cable of any appropriate configuration and formed from any appropriate material or combination of materials (e.g., stainless steel).

The actuator assembly 210 may be characterized as including a housing assembly 220. The housing assembly 220 may include a first housing section 222, a second housing section 224, and an outlet fitting 226 on a distal end of the housing assembly 220. A body or solenoid body 240 (e.g., a fixed core) is partially disposed within the housing assembly 220. The solenoid body 240 includes a first pressurized fluid cavity 248 and a first fluid passage 250 that extends from the first pressurized fluid cavity 248 at least generally in the direction of the outlet fitting 226 (e.g., in the longitudinal dimension). A proximal portion of the solenoid body 240 extends proximally of the housing assembly 220 (e.g., in the longitudinal dimension). A pressure sensor 242 of any appropriate type (e.g., a MEMS device) may be operatively interconnected with the first pressurized fluid cavity 248 (e.g., on a portion of the solenoid body 240 that is disposed proximally of the housing assembly 220). An appropriate pressurized fluid (e.g., one or more gases, and including air) may be directed into the first pressurized fluid cavity 248 through a fill valve 244. The fill valve 244 is located on a portion of the solenoid body 240 that is disposed proximally of the housing assembly 220 to accommodate "re-filling" of the first pressurized fluid cavity 248 (or more generally the actuator assembly 210) with a pressurized fluid, for instance after the cable cutter assembly 200 has been operated to cut a cable or to address the case of a leakage. A plug 246 may be used to retain the pressurized fluid within the first pressurized fluid cavity 248 (or more generally within the actuator assembly 210). A coil 270 is disposed about at least a portion of the solenoid body 240. The coil 270 may be enclosed between the first housing section 222 of the housing assembly 220 and the solenoid body 240.

The first fluid passage 250 for the solenoid body 240 may be characterized as including a first longitudinal passage segment or section 252, a second longitudinal passage segment or section 254, and a third longitudinal passage segment or section 256, with the second longitudinal passage segment 254 being disposed between the first longitudinal passage segment 252 and the third longitudinal passage segment 256 (each such longitudinal passage segment having a length that proceeds at least generally in the noted longitudinal dimension and that would coincide with a direction of flow along/through a corresponding longitudinal passage segment). An outer diameter of the first longitudinal passage segment 252 may be larger than an outer diameter of the second longitudinal passage segment 254. An outer diameter of the third longitudinal passage segment 256 may be larger than an outer diameter of at least one of the first longitudinal passage segment 252 and the second longitudinal passage segment 254. FIGS. 2 and 3 illustrate the third longitudinal passage segment 256 as having a larger outer diameter than both the first longitudinal passage segment 252 and the second longitudinal passage segment 254.

An armature or plunger 290 is movably interconnected with the solenoid body 240 for movement relative to the solenoid body 240 along the longitudinal axis 202 of the cable cutter assembly 200, with a proximal portion of the armature 290 being disposed within the third longitudinal passage segment 256 of the solenoid body 240. A spring 280 is also disposed within the third longitudinal passage segment 256 of the solenoid body 240 and biases the armature 290 along the longitudinal axis 202 in the direction of the outlet fitting 226. A non-magnetic spacer 260 may be disposed between a corresponding portion of the armature 290 and the coil 270. The armature 290 and coil 270 may be collectively referred to as a solenoid.

A second fluid passage 292 extends through the armature 290 and proceeds at least generally along the longitudinal or length dimension of the cable cutter assembly 200. A first longitudinal passage segment 294 of the second fluid passage 292 (armature 290) extends from the third longitudinal passage segment 256 of the first fluid passage 250 (solenoid body 240). One or more second longitudinal passage segments 296 of the second fluid passage 292 extend from its first longitudinal passage segment 294 to a second pressurized fluid cavity 310 (in diverging relation to the longitudinal axis 202 proceed from the third longitudinal passage segment 256 of the first fluid passage 250 (solenoid body 240) to the second pressurized fluid cavity 310). The second pressurized fluid cavity 310 may be defined by the space between a distal section of the armature 290 and the housing assembly 220 (e.g., the second housing section 224). In any case, the second pressurized fluid cavity 310 is fluidly connected with the first pressurized fluid cavity 248 by the first fluid passage 250 (solenoid body 240) and the second fluid passage 292 (armature 290). A common pressurized fluid should thereby be disposed within the first pressurized fluid cavity 248, second pressurized fluid cavity 310, first fluid passage 250 (solenoid body 240), and second fluid passage 292 (armature 290). The first pressurized fluid cavity 248, second pressurized fluid cavity 310, first fluid passage 250 (solenoid body 240), and second fluid passage

292 (armature 290) may be characterized as collectively defining a pressurized fluid source for the actuator assembly 210. Moreover, the first pressurized fluid cavity 248, second pressurized fluid cavity 310, first fluid passage 250 (solenoid body 240), and second fluid passage 292 (armature 290) should be at a common static pressure (e.g., prior to initiating operation of the actuator assembly 210; prior to applying a voltage to/energizing the coil 270).

When the actuator assembly 210 or armature 290 is in a first or closed position (FIG. 2), a distal end of the armature 290 (that includes a valve seal 304) engages the outlet fitting 226 to block fluid communication of the second pressurized fluid cavity 310 with an outlet port 228 that extends through the outlet fitting 226. At this time (when the actuator assembly 210/armature 290 is in the first/closed position of FIG. 2), there is a first air gap 300 and a second air gap 302 between the armature 290 and the solenoid body 240.

When the actuator assembly 210 or armature 290 is in a second or open position (FIG. 3), via operation of the coil 270 (when at least a certain voltage is applied to the coil 270; when the coil 270 is disposed in an energized state) and a resulting compression of the spring 280 by a movement of the armature 290 relative to the solenoid body 240 away from the outlet fitting 226 provided by a magnetic force exerted on the armature 290, the valve seal 304 of the armature 290 is spaced from the outlet fitting 226 to allow pressurized fluid to flow from the second pressurized fluid cavity 310 through the outlet port 228 of the outlet fitting 226. The size of the first air gap 300 and second air gap 302 between the armature 290 and the solenoid body 240 is at least reduced when the actuator assembly 210/armature 290 is in the second/open position of FIG. 3 in comparison to the first/closed position of FIG. 2.

Based upon the forgoing, the armature 290 may be characterized as being a valve that is movable between a first/closed position (FIG. 2) to isolate a pressurized fluid (or to isolate a pressurized fluid source of the actuator assembly 210) from the cutter assembly 320, and a second/open position (FIG. 3) to accommodate a flow of pressurized fluid into the cutter assembly 320 (or to fluidly connect a pressurized fluid source of the actuator assembly 210 with the cutter assembly 320). Movement of the armature 290 from the first/closed position of FIG. 2 to the second/open of FIG. 3 is realized by operation of the actuator assembly 210, namely by applying at least a certain voltage (e.g., a threshold voltage) to the coil 270 (e.g., disposing the coil 270 in an energized state) to create a magnetic field that exerts a force on the armature 290 to move the armature 290 in the above noted manner (e.g., along the longitudinal axis 202 in a direction that is away from the outlet fitting 226). When the magnetic field is released (e.g., when the coil 270 is returned to a de-energized state), the spring 280 moves the armature 290, along the longitudinal axis 202 and relative to the solenoid body 240, back to the first/closed position of FIG. 2.

The cutter assembly 320 may be characterized as being disposed at a distal end of the housing assembly 220 and disposed about the outlet fitting 226. The cutter assembly 320 includes a cutter body 322 having a cutter body cavity 324 that is fluidly connected with the outlet port 228 of the outlet fitting 226. A cutter or piston 326 is movably disposed within the cutter body cavity 324. One or more seals 328 (e.g., an O-ring) may be provided between an outer perimeter of the cutter 326 and an outer perimeter of the cutter body cavity 324 that is defined by the cutter body 322.

At least one latch or shear pin 332 may maintain the cutter 326 in a fixed position relative to the cutter body 322, where the cutter 326 is spaced from an anvil or stopper 340 at a distal end of the cutter body cavity 324. A cable 360 may extend through the cutter body cavity 324 at a location that is between the cutter 326 and the anvil 340. The cutter 326 may include at least one cutter knife edge 330 for cutting through/severing the cable 360 in response to operation of the actuator assembly 210 to move the cutter 326 relative to the cutter body 322 and toward the cable 360/anvil 340 (after each latch pin 332 has been disabled/sheared/ruptured/broken).

When the actuator assembly 210/armature 290 is in the first/closed position of FIG. 2, the cutter body cavity 324 should be fluidly isolated from the second pressurized fluid cavity 310. The existence of a leak from the second pressurized fluid cavity 310 into the cutter body cavity 324 could adversely affect the ability of the cable cutter assembly 200 to cut through/sever the cable 360 in the desired manner and/or could result in inadvertent actuation of the cutter 326. In this regard, one or more leak vent fittings 350 may be fluidly connectable with the cutter body cavity 324, with each leak vent fitting 350 including one or more leak ports 352. This fitting 350 may incorporate features to prevent the ingress of media from the external ambience to within the cutter body cavity 324.

Figures 6A, 6B:
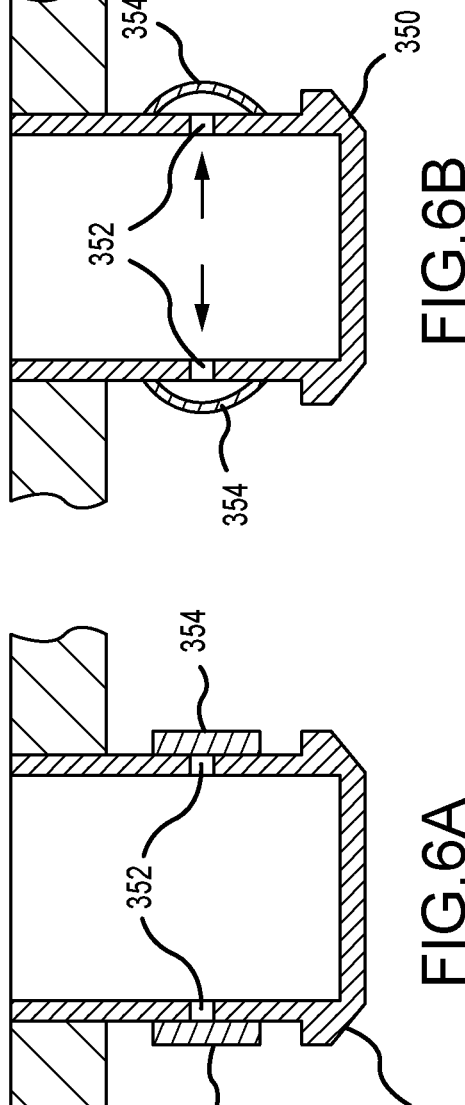
FIG. 6A is an enlarged cross-sectional view of a leak vent fitting that may be used by the cable cutter assemblies of FIGS. 2-5 and illustrating a first condition, in accordance with various embodiments.
FIG. 6B is an enlarged cross-sectional view of the leak vent fitting of FIG. 6A and illustrating a different second condition, in accordance with various embodiments.

Referring now to FIGS. 6A-6B, an elastomeric sleeve 354 may be disposed over at least one leak port 352 of a leak vent fitting 350. Accumulation of the leaked gas pressure within the cutter body cavity 324 will push this sleeve 354 radially out (FIG. 6B) and vent the gas through the narrow passages formed in the elastomeric sleeve 354 (these passages "opening" in response to stretching of the sleeve 354). Once the leaked gas is vented to the external ambient, the pressure in the cutter body cavity 324 drops and the elastomeric sleeve (s) 354 returns back to the original state (FIG. 6A) to reduce the potential of external media entering the cutter body cavity 324 (e.g., by the noted passage(s) in the sleeve 354 closing by the noted contraction of the sleeve 354).

Referring back to FIG. 2, it again shows the actuator assembly 210 using dual air gaps and being in a de-energized state. The actuator assembly 210 may be characterized as utilizing a fast-acting type solenoid (at least the coil 270 and armature 290) with an inline, normally closed solenoid valve (e.g., the distal end of the armature 290 with the valve seal 304). The armature 290 is of a flat disc-shaped type and includes the second fluid passage 292. The valving unit or valve seal 304 on the distal end of the armature 290 is a flat poppet type. For valve leak tightness, the valve seal 304 uses a soft valve seal and is retained in a cavity on the distal end of the armature 290.

The solenoid coil 270 is again disposed between the solenoid body 240 and the housing assembly 220. The working air gaps 300, 302 are defined between the body pole faces and the flat faces of the armature 290. The magnetic flux path, when the solenoid coil 270 is energized, proceeds about the coil 270 (via the body of the armature 290) and passes through the two air gaps 300, 302. As shown, the inlet side of the actuator assembly 210 is provided with cavity volume (first pressurized fluid cavity 248) which may be "filled" or loaded with a pressurized fluid (e.g., one or more gases) using the fill valve 244 (e.g., of a miniature type) assembled to the extreme inlet side. This cavity fluid pressure may be monitored using the pressure sensor 242, which is attached to the solenoid body 240. The inlet of the fill valve 244 may be incorporate a plug 246 to provide a leak-tight seal. In the solenoid de-energized state, the valve seal 304 is loaded by the solenoid spring force (spring 280) and the unbalanced fluid pressure acting at the valve sealing area. The valve seat is provided within the outlet fitting 226. This way, the valve seal 304 is stressed to the seating region in the outlet fitting 226. By suitable seal design, stringent leak tightness may be achieved.

When the solenoid is energized (more specifically, the coil 270), the armature 290 along with valve seal 304 are moved to solenoid pole face, such that the air gaps 300, 302 are reduced to a minimum value. This creates the solenoid valve opening as shown in the FIG. 3. Upon the opening of the solenoid valve (e.g., the distal end of the armature 290), the pressurized fluid stored (e.g., pneumatic medium gas) in the first pressurized fluid cavity 248, the first fluid passage 250, the second fluid passage 292 and the second pressurized fluid cavity 310 gets discharged through the outlet port 228 into the cutter body cavity 324.

The downstream portion of the solenoid valve is assembled with the cutter body 322, which houses the cutter/piston 326. The cutter 326 may use a radial O ring seal 328 and it is latched/secured using at least one latch or shear pin 332 in the pre-firing phase. The fluid charging and the gas pressure build up in the cutter body cavity 324 replicates the gas pressure built up by the firing of an electric squib-type cable cutter. The pressure acting at the piston O-ring seal 328 develops the pressure force. This force value increases and ruptures the corresponding latch/shear pin(s) 332. By this, the cutter 326 experiences "snap acceleration" movement toward the cable 360.

Summarizing the foregoing, FIG. 2 shows the first/closed position for the actuator assembly 210/armature 290, where the valve seal 304 of the armature 290 engages the outlet fitting 226, preferably such that there is no or only minimal/insignificant leakage from the second pressurized fluid cavity 310 into the cutter body cavity 324. The pressure of the pressurized fluid should be constant throughout the first pressurized fluid cavity 248, the first fluid passage 250, the second fluid passage 292, and the second pressurized fluid cavity 310. At this time, the coil 270 is not exerting a force on the armature 290 (e.g., the coil 270 is in a de-energized state), but the spring 280 is exerting a force on the armature 290 to dispose the valve seal 304 in fluid sealing engagement with the outlet fitting 226 (e.g., to fluidly isolate the second pressurized fluid cavity 310 from the cutter body cavity 324). Moreover, there is a net unbalanced fluid pressure force when the coil 270 is in a de-energized state. Taking the entire valve inner cavity, namely the first pressurized fluid cavity 248, the first fluid passage 250, the second fluid passage 292, and the second pressurized fluid cavity 310, the net pressure unbalanced region is in the area equivalent to the outer diameter of the outlet fitting 226 (or a seat land, for instance formed from metal and that interfaces with a softer valve seal 304) and that is exposed to fluid pressure. The fluid pressure load in this area aids in disposing the actuator assembly 210/armature 290 in the first/closed position (FIG. 2). As such, the sum of the spring force (spring 280) and this unbalanced fluid pressure force provides the total closing/sealing force for the actuator assembly 210/armature 290.

Activation of actuator assembly 210, namely by applying at least a certain voltage to the coil 270 (e.g., disposing the coil 270 in an energized state), creates a magnet field that exerts a magnetic force on the armature 290 to move the armature 290 along the longitudinal axis 202 from the first/closed position of FIG. 2 into the second/open position of FIG. 3 (and against the biasing force of the spring 280), such that the valve seal 304 (armature 290) is now spaced from the outlet fitting 226. As such, pressurized fluid (within the first pressurized fluid cavity 248, the first fluid passage 250, the second fluid passage 292 and the second pressurized fluid cavity 310) may flow from the second pressurized fluid cavity 310, through the outlet port 228 of the outlet fitting 226, and into the cutter body cavity 324 to exert a fluid pressure on the cutter 326 that is directed toward the cable 360 and the anvil 340. Once the pressure within the cutter body cavity 324 satisfies a certain pressure threshold, each latch pin 332 should be disabled/sheared/ruptured/broken to allow the cutter 326 to advance in the direction of and to cut/sever the cable 360 (e.g., to separate the hook assembly 108 from the remainder of the hoist assembly 104 and also from the airframe 102—FIG. 1).

Figure 4:
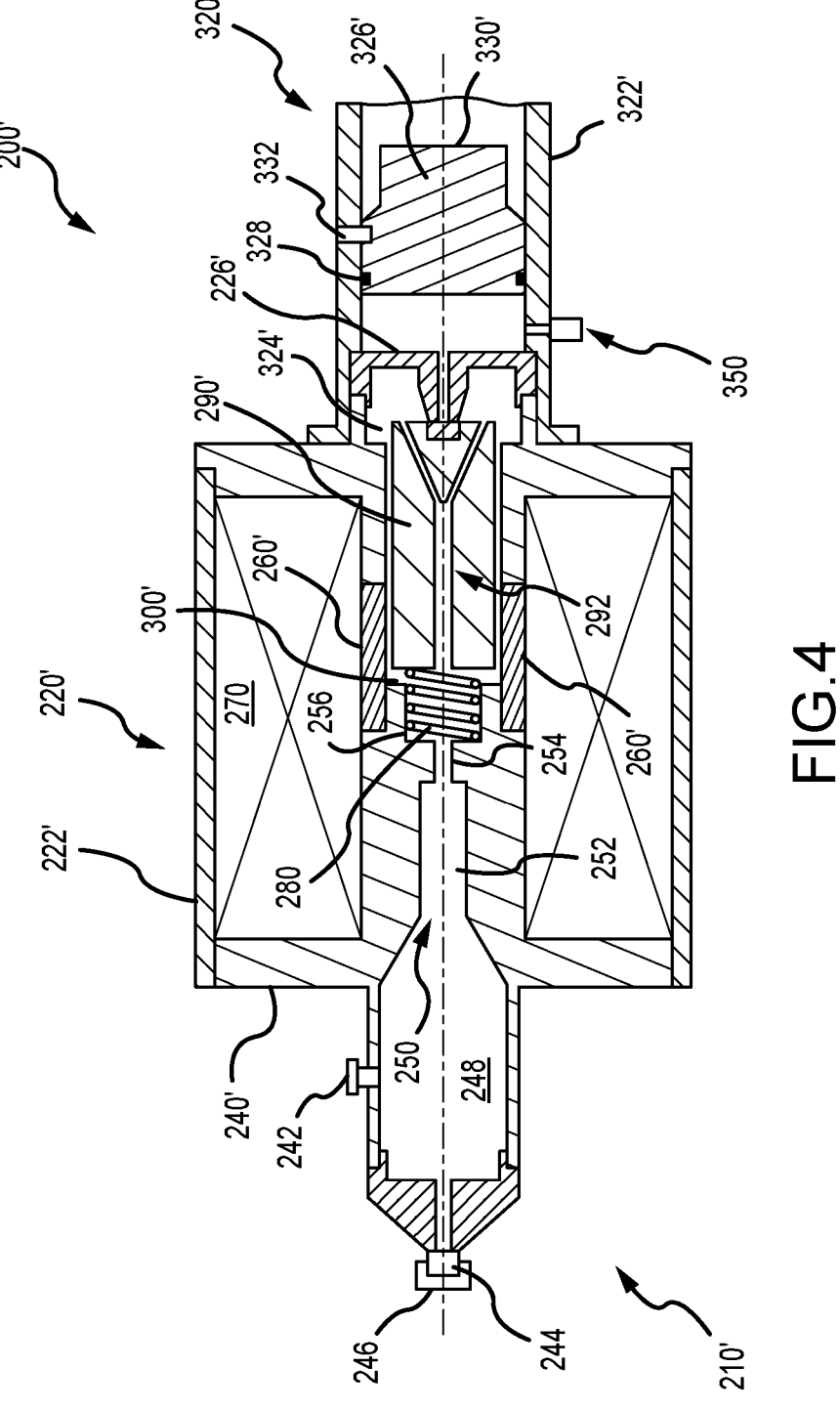
FIG. 4 is a cross-sectional view of another cable cutter assembly for a hoist with an actuator assembly/armature being in a closed position, in accordance with various embodiments.
Figure 5:
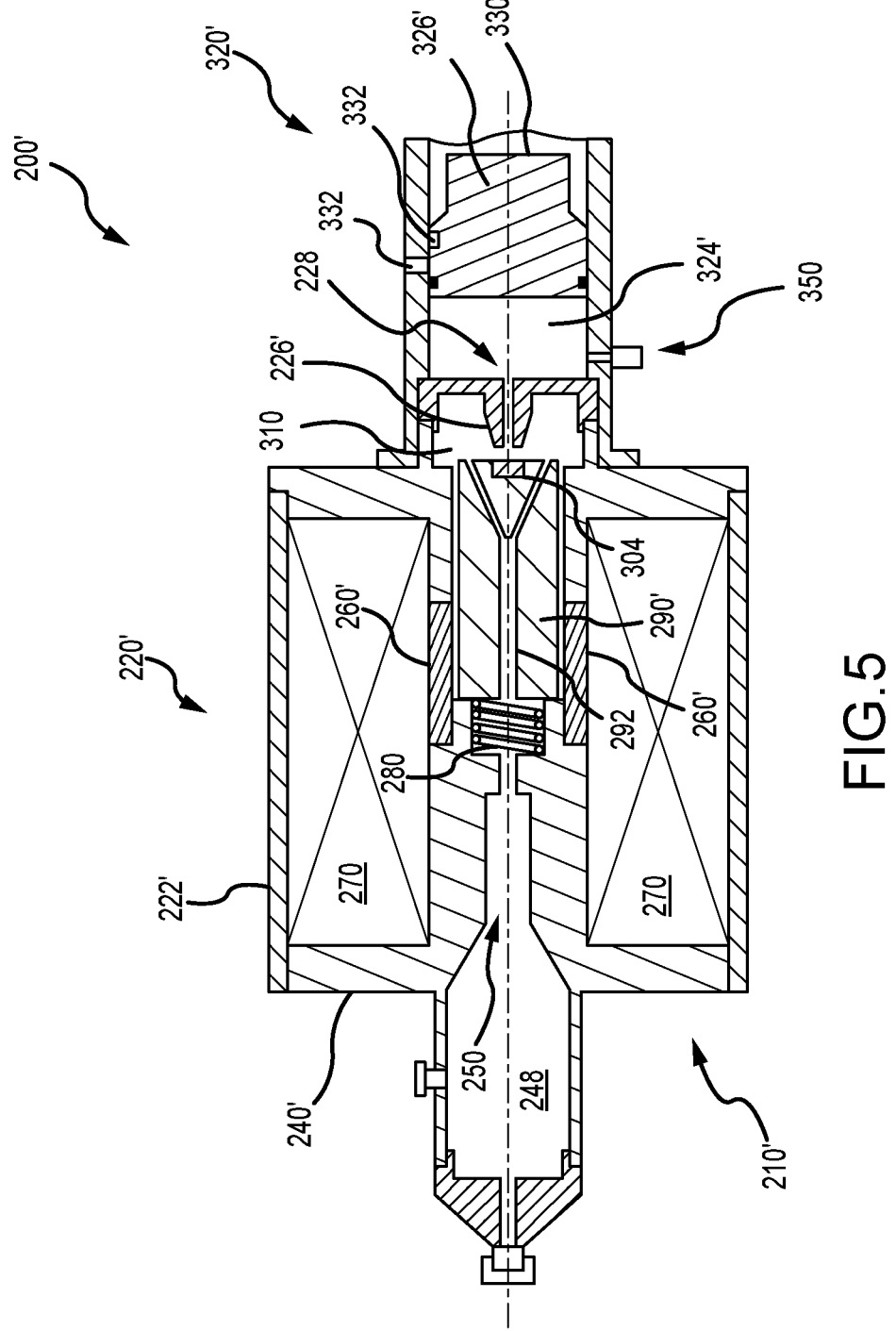
FIG. 5 is a cross-sectional view of the cable cutter assembly of FIG. 4 with the actuator assembly/armature being in an open position, in accordance with various embodiments.

A variation of the cable cutter assembly 200 of FIGS. 2-3 is illustrated in FIGS. 4-5 and is identified by reference numeral 200'. Corresponding components between the cable cutter assembly 200 and the cable cutter assembly 200' are identified by the same reference numerals. Those corresponding components that differ between the cable cutter assembly 200 and the cable cutter assembly 200' are further identified by "single prime" designation with regard to the cable cutter assembly 200' of FIGS. 4-5. By way of initial summary, the cable cutter assembly 200 (FIGS. 2-3) may be characterized as using dual working air gaps, while the cable cutter assembly 200' (FIGS. 4-5) may be characterized as using a single air gap. The response time for moving the armature 290 from the first/closed position of FIG. 2 to the second/open position of FIG. 3 may be faster than the response time for moving the armature 290' from the first/closed position of FIG. 4 to the second/open position of FIG. 5. Otherwise, the cable cutter assembly 200' may be viewed as substantially corresponding with the cable cutter assembly 200'.

The following components of the cable cutter assembly 200' of FIGS. 4-5 differ (e.g., structurally and/or sizing) from the corresponding component of the cable cutter assembly 200 of FIGS. 2-3: actuator assembly 210'; housing assembly 220; first housing section 222'; body or solenoid body 240'; non-magnetic spacer(s) 260'; armature or plunger 290'; and air gap 300'. The cutter assembly 320' of FIGS. 4-5 also differs from the cutter assembly 320 of FIGS. 2-3, including in relation to how the cutter assembly 320' is integrated with the actuator assembly 210'. As such, the cutter body 322', cutter body cavity 324', the cutter or piston 326' and cutter knife edge 330' of FIGS. 4-5 differ (e.g., structurally and/or sizing) from the corresponding component(s) of the cable cutter assembly of FIGS. 2-3.

In the de-energized state or condition (FIG. 4), the fluid pressure is continuously acting at the valve seal 304 (of the armature 290') and the leak tightness (e.g., a hermetic seal) is maintained. By suitable design, the valve seal 304 may be fully contained within a metallic cavity on the end of the armature 290' and cold flow of the valve seal 304 can be eliminated. By providing appropriate sealing stress, it is possible to achieve seal leak tightness in the range of 10–5 scc/sec of GHe and possible to maintain this leak tightness for long operating periods of 4 to 5 years, for instance. The specified or the allowed minute gas leak flow can eventually get "filled" in the downstream cutter body cavity 324'. The accumulation of this leaked fluid eventually builds up pressure and could cause inadvertent actuation of the cutter 326'. In order to reduce the potential for inadvertent actuation of the cutter 326', this leaked gas again may be vented to the external ambient using the above-noted leak vent fitting(s) 350 (fluidly connected with the cutter body cavity 324') and the corresponding discussion presented above on FIGS. 6A and 6B.

The cable cutter assembly 200' operates at least generally in accord with the cable cutter assembly 200 of FIGS. 2-3.

FIG. 4 shows the first/closed position for the actuator assembly 210'/armature 290', where the valve seal 304 of the armature 290' engages the outlet fitting 226', preferably such that there is no or only minimal/insignificant leakage from the second pressurized fluid cavity 310 into the cutter body cavity 324'. The pressure of the pressurized fluid should be constant throughout the first pressurized fluid cavity 248, the first fluid passage 250, the second fluid passage 292, and the second pressurized fluid cavity 310. At this time, the coil 270 is not exerting a force on the armature 290' (e.g., the coil 270 is in a de-energized state), but the spring 280 is exerting a force on the armature 290' to dispose the valve seal 304 in fluid sealing engagement with the outlet fitting 226' (e.g., to fluidly isolate the second pressurized fluid cavity 310 from the cutter body cavity 324').

Activation of actuator assembly 210, namely by applying at least a certain voltage to the coil 270 (e.g., disposing the coil 270 in an energized state), creates a magnet field that exerts a magnetic force on the armature 290' to move the armature 290' along the longitudinal axis 202 from the first/closed position of FIG. 4 into the second/open position of FIG. 5 (and against the biasing force of the spring 280), where the valve seal 304 (armature 290) is now spaced from the outlet fitting 226'. As such, pressurized fluid (within the first pressurized fluid cavity 248, the first fluid passage 250, the second fluid passage 292 and the second pressurized fluid cavity 310) may flow from the second pressurized fluid cavity 310, through the outlet port 228 of the outlet fitting 226', and into the cutter body cavity 324' to exert a fluid pressure on the cutter 326' that is directed toward the cable and anvil (not shown in FIGS. 4-5, but in accord with FIGS. 2-3). Once the pressure within the cutter body cavity 324' satisfies a certain pressure threshold, each latch pin 332 should be disabled/sheared/ruptured/broken to allow the cutter 326' to advance in the direction of and to cut/sever the cable (e.g., to separate the hook assembly 108 from the remainder of the hoist assembly 104 and also from the airframe 102—FIG. 1).

Figure 7:
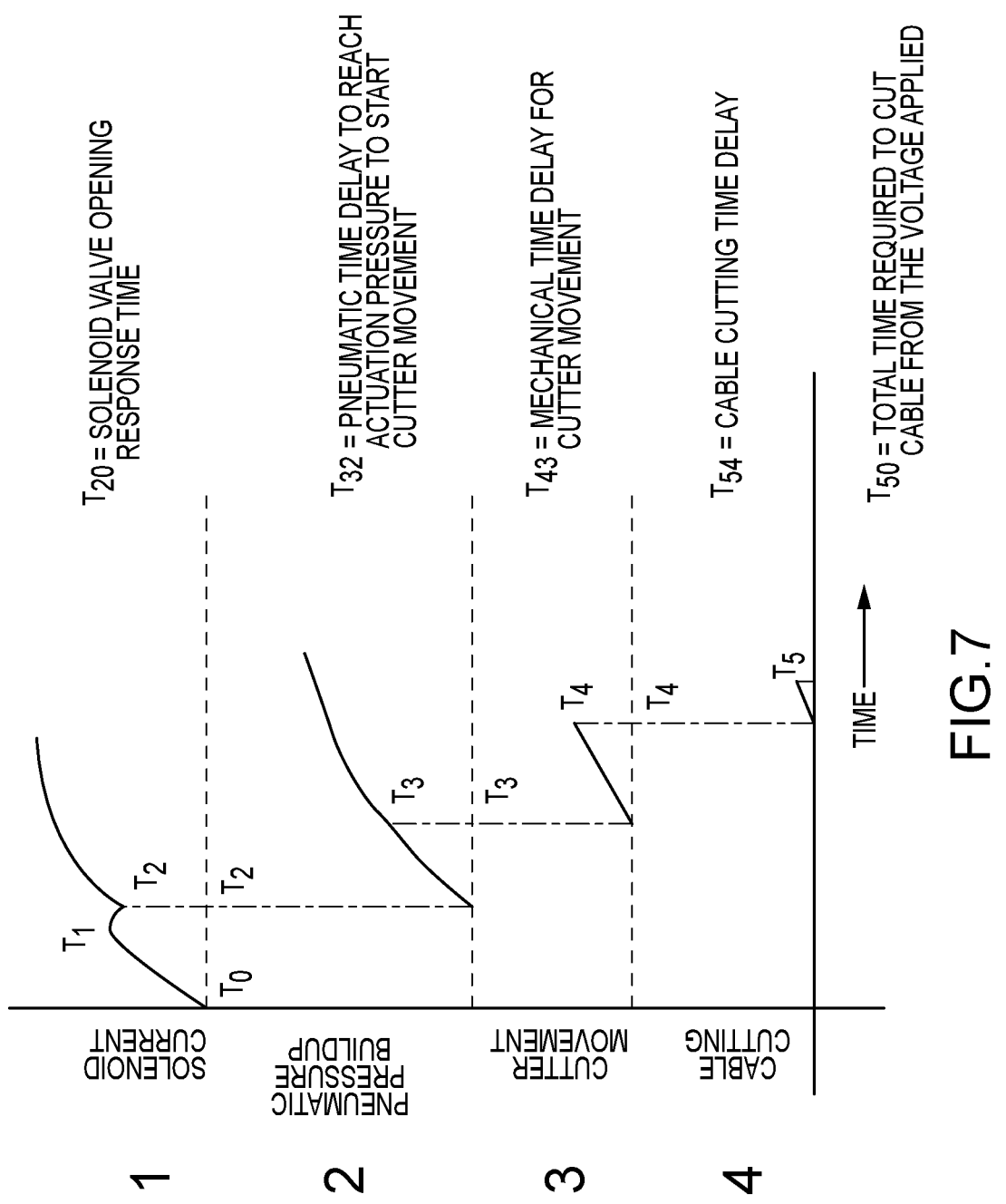
FIG. 7 graphically presents representative operation of at least the cable cutter assembly of FIGS. 2-3, in accordance with various embodiments.

FIG. 7 shows the different sublevel events of the electro-pneumatic (or more generally "fluid") cutting action in a time-based manner for at least the cable cutter assembly 200 of FIGS. 2-3. Once the electric voltage is applied to the coil 270, the first event is the solenoid valve opening (movement of the armature 290 from the FIG. 2 position to the FIG. 3 position). The first figure of FIG. 7 shows the current build up coil 270 and the armature/plunger 290 movement for valve opening. $T_0$=the DC voltage application time to the coil 270. $T_1$=the time at which the coil 270 begins to start exerting a pulling force on the armature 290 (in a direction that is away from the outlet fitting 226), where the armature 290 starts to move, and where the cutter body cavity 324 begins getting charged with fluid pressure. Time $T_1$ to $T_0$ defines the electrical time delay of the coil 270. $T_2$=the time at which solenoid valve opens fully (completion of the movement of the armature 290 from the FIG. 2 position to the FIG. 3 position). Time $T_2$ to $T_1$ defines the mechanical time delay of the coil 270. Time $T_2$ to $T_0$ (identified as $T_{20}$ on FIG. 7) defines the total time delay or opening response time of the solenoid valve at the specified inlet pressure and the voltage applied.

Once the solenoid valve has opened (where the armature 290 has moved from the FIG. 2 position at least toward the FIG. 3 position), the pressurized fluid gets discharged to the cutter body cavity 324 and the pressure force build-up begins. The second figure of FIG. 7 shows the fluid pressure build up in the cutter body cavity 324. $T_3$=the time at which the minimum required fluid pressure force is developed in the cutter body cavity 324, which starts to push and move the cutter/piston 326 toward the cable 360 and the anvil 340. Time $T_3$ to $T_2$ (identified as $T_{32}$ on FIG. 7) represents the pressurized fluid time delay to reach the actuation pressure within the cutter body cavity 324, where this actuation pressure is sufficient to move the cutter/piston 326 toward the cable 360 and the anvil 340 (e.g., to release the cutter 326 by disabling the latch pin(s) 332).

The required magnitude of the above-noted actuation pressure is dependent on the rupturing force of the latch pin(s) 332. A higher actuation pressure (for rupturing the latch pin(s) 332) provides a higher cutting force (for severing the cable 360) and a higher velocity for the cutter/piston 326. That is, the fluid pressure force at which the cutter/piston 326 starts to move, along with the associated speed of the cutter/piston 326, is influenced by the latch pin design for its rupturing. The cutting force of the cutter/piston 326 is influenced by the actuator design and the latch pin design.

The third figure of FIG. 7 shows the cutter/piston 326 displacement profile with time. Time $T_4$ to $T_3$ (identified as $T_{43}$ on FIG. 7) represents the mechanical time delay for movement of the cutter/piston 326.

$T_4$=the cutter/piston 326 having completed moving to the anvil 340 with the required speed and the cutter knife edge 330 having hit the cable 360. During this phase, the cutter/piston 326 experiences accelerated movement and the cutter knife edge 330 of the cutter/piston 326 cuts/shears the cable 360. Simultaneously, the pressure force is increasing to induce high energy to the cutter/piston 326. The fourth figure on FIG. 7 shows the cable cutting physical action time. $T_5$=the time instant at which cutting of the cable 360 is complete. Time $T_5$ to $T_4$ (identified as $T_{54}$ on FIG. 7) represents the time delay for the cutting of the cable 360. Time $T_5$ to $T_0$ (identified as $T_{50}$ on FIG. 7) represents the total time required to cut/sever the cable 360 from the time at which the voltage is initially applied to the coil 270.

By suitable design of the solenoid valve, the overall time delay from the instant of voltage application to complete the cable cutting ($T_{50}$ in FIG. 7) may be achieved within 8 to 10 milliseconds. Compared to a squib-based cable cutter, the actuator assembly 210 operates on lower electric current, and the electric power required is much less. By designing for higher DC power, the electric response of the actuator assembly 210 can be improved. The actuator assembly 210 with dual working airgaps (FIGS. 2-3) features fast opening response times. Compared to an electric squib-based cable cutter, the actuator assembly 210 may be operated repeatedly, and with at least the potential for reduced maintenance requirements. After each firing, the only expendable typically required is the replacement of the sleeve(s) 354 assembled to the leak vent fitting(s) 350. The usage of the above-noted pressure sensor 242 facilitates tracking of the fluid pressure (within the first pressurized fluid cavity 248, the first fluid passage 250, the second fluid passage 292 and the second pressurized fluid cavity 310) at any time. Using a wireless pressure sensor 242 can eliminate associated electric cabling requirements.

Based on the design of at least the cable cutter assembly 200 of FIGS. 2-3, it is possible to define a minimum threshold pressure within the first pressurized fluid cavity 248, the first fluid passage 250, the second fluid passage 292 and the second pressurized fluid cavity 310 for the cutting of the cable 360 within the minimum required time in the above-noted manner. Due to long service life in the pressurized condition (within the first pressurized fluid cavity 248, the first fluid passage 250, the second fluid passage 292 and the second pressurized fluid cavity 310), if the pressure falls below that of the minimum threshold value, the first pressurized fluid cavity 248, the first fluid passage 250, the second fluid passage 292 and the second pressurized fluid cavity 310 can be "re-pressurized" through the fill valve 244.

An electro-pneumatic design for at least the cable cutter assembly 200 may use a fast-acting solenoid valve designed to hold pneumatic pressure with good leak tightness. Upon solenoid energization, pressure is discharged into the cutter body cavity 324 where the cutter 326 is located. This cavity pressure develops fluid pressure force to accelerate the cutter 326 toward the cable 360 for cutting/severing the cable 360. The solenoid valve with a stored pressurized fluid (the actuator assembly 210) at least meets the performance of an electric squib-based cable cutter. The actuator assembly 210 can be designed for fast response and for the stringent leak tightness. The actuator assembly 210 can be used repeatedly and hence this possesses built in test features. Solenoids are highly reliable and cost-effective devices.

The configurations of the cable cutter assemblies 200, 200' can be used for both "new construction" and for retrofits (where the same would replace an electric squib-based cable cutter). For the same amount of gas, usage of higher gas pressure in the first pressurized fluid cavity 248, the first fluid passage 250, the second fluid passage 292 and the second pressurized fluid cavity 310, may reduce the volume requirement of one or more of the first pressurized fluid cavity 248, the first fluid passage 250, the second fluid passage 292 and the second pressurized fluid cavity 310.

A wireless pressure sensor 242 added to the first pressurized fluid cavity 248 facilitates tracking of the stored gas pressure data and based on which in-service maintenance may be scheduled. By all these attributes, the cable cutter assemblies 200/200' possess desired operational reliability features.

Any feature of any other various aspects addressed in this disclosure that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least substantially," "at least generally," or the like in relation to a particular feature encompasses the corresponding characteristic and insubstantial variations thereof (e.g., indicating that a surface is at least substantially or at least generally flat encompasses the surface actually being flat and insubstantial variations thereof). Finally, a reference of a feature in conjunction with the phrase "in one embodiment" does not limit the use of the feature to a single embodiment.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the present disclosure. Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A cable cutter assembly for a hoist, comprising:
an actuator assembly comprising:
a first housing section;
a solenoid body disposed within the first housing section;
a second housing section adjacent to the first housing section;
an armature with a distal portion disposed partially within the second housing section and a proximal portion disposed partially within a passage segment of the solenoid body, wherein the distal portion of the armature extends between and slidably in contact with the inner radial walls of the second housing section;
a spring disposed within the passage segment between a proximal end of the proximal portion of the armature and the solenoid body;
a fluid passage between the solenoid body and the armature;
at least one pressurized fluid cavity;
a first outlet port disposed within the second housing section;
a coil disposed within the solenoid body and enclosed by the first housing section about an outer diameter of the coil and the solenoid body about an inner diameter of the coil and on both ends of the coil, wherein the armature is movable between a closed position and an open position relative to the first outlet port, wherein the armature engages the first outlet port when in the closed position and is spaced from the first outlet port when in the open position;
a non-magnetic spacer disposed within an end of the solenoid body between a proximal end of the armature and distal end of a corresponding portion of the coil;
a cutter body comprising a cutter body cavity fluidly connected with the first outlet port; and
a cutter disposed within the cutter body cavity;
wherein disposing the armature in the open position fluidly connects the at least one pressurized fluid cavity with the cutter body cavity to move the cutter in a cable cutting direction.

2. The cable cutter assembly of claim 1, wherein the at least one pressurized fluid cavity comprises a pressurized fluid, and wherein the pressurized fluid comprises at least one gas.

3. The cable cutter assembly of claim 1, wherein the armature is moved from the closed position to the open position in response to energizing the coil.

4. The cable cutter assembly of claim 1, wherein the armature comprises a valve seal that engages the first outlet port when the armature is in the closed position.

5. The cable cutter assembly of claim 1, wherein the spring engages with the armature and biases the armature toward the closed position.

6. A helicopter comprising a hoist assembly and the cable cutter assembly of claim 1, wherein the hoist assembly comprises a hook assembly, and wherein the cable cutter assembly is operable to sever the hook assembly from a remainder of the hoist assembly.

7. A cable cutter assembly for a hoist, comprising:
an actuator assembly comprising:
a first housing section;
a solenoid body disposed within the first housing section and comprising a first pressurized fluid cavity and a first fluid passage extending from the first pressurized fluid cavity;
a second housing section adjacent to the first housing section;
an armature with a distal portion disposed partially within the second housing section and a proximal portion disposed partially within a passage segment of the solenoid body, the distal portion of the armature extending between and slidably in contact with the inner radial walls of the second housing section, the armature comprising a second fluid passage fluidly interconnected with the first fluid passage and movable between a first position and a second position, wherein the armature and the solenoid body define an airgap therebetween when the armature is in the first position;

a second pressurized fluid cavity fluidly interconnected with the first fluid passage by the second fluid passage;

a spring disposed within the passage segment between a proximal end of the proximal portion of the armature and the solenoid body;

a coil disposed within the solenoid body and enclosed by the first housing section about an outer diameter of the coil and the solenoid body about an inner diameter of the coil and on both ends of the coil;

a non-magnetic spacer disposed within an end of the solenoid body between a proximal end of the armature and distal end of a corresponding portion of the coil;

a first outlet port disposed within the second housing section, wherein the armature engages the first outlet port when the armature is in the first position;

a cutter body comprising a cutter body cavity; and a cutter disposed within the cutter body cavity, wherein activation of the coil moves the armature to the second position, thereby disposing the armature in spaced relation to the first outlet port, fluidly connecting the second pressurized fluid cavity with the cutter body cavity, and moving the cutter in a cable cutting direction.

8. The cable cutter assembly of claim 7, wherein the first pressurized fluid cavity, the second pressurized fluid cavity, the first fluid passage, and the second fluid passage each comprise a pressurized fluid, and wherein the pressurized fluid comprises at least one gas.

9. The cable cutter assembly of claim 7, wherein the armature is moved from the first position to the second position in response to energizing the coil.

10. The cable cutter assembly of claim 7, wherein the armature comprises a valve seal that engages the first outlet port when the armature is in the first position.

11. The cable cutter assembly of claim 7, wherein the spring engages with the armature and biasing the armature toward the first position.

12. A helicopter comprising a hoist assembly and the cable cutter assembly claim 7, wherein the hoist assembly comprises a hook assembly, and wherein the cable cutter assembly is operable to sever the hook assembly from a remainder of the hoist assembly.

* * * * *